US006993858B2

(12) United States Patent  
Seamans

(10) Patent No.: US 6,993,858 B2  
(45) Date of Patent: Feb. 7, 2006

(54) BREATHABLE FOOTWEAR PIECES

(75) Inventor: Scott Seamans, Longmont, CO (US)

(73) Assignee: Crocs, Inc., Niwot, CO (US)

( * ) Notice: Subject to any disclaimer, the term of this patent is extended or adjusted under 35 U.S.C. 154(b) by 133 days.

(21) Appl. No.: 10/603,126

(22) Filed: Jun. 23, 2003

(65) Prior Publication Data

US 2004/0231189 A1    Nov. 25, 2004

Related U.S. Application Data

(60) Provisional application No. 60/473,360, filed on May 23, 2003, provisional application No. 60/473,371, filed on May 23, 2003.

(51) Int. Cl.
 *A43B 7/06* (2006.01)
 *A43B 3/12* (2006.01)
(52) U.S. Cl. ............................ 36/3 A; 36/11.5; 36/50.1
(58) Field of Classification Search ................ 36/3 R, 36/3 A, 3 B, 7.5, 11.5, 98, 29
See application file for complete search history.

(56) References Cited

U.S. PATENT DOCUMENTS

| | | | | |
|---|---|---|---|---|
| 2,180,924 | A | * | 11/1939 | Dunbar ........................ 36/3 B |
| 4,476,600 | A | * | 10/1984 | Seidel et al. .............. 12/142 V |
| 4,888,887 | A | * | 12/1989 | Solow ......................... 36/3 R |
| 4,967,750 | A | * | 11/1990 | Cherniak ..................... 36/140 |
| 5,369,895 | A | * | 12/1994 | Hammerschmidt .......... 36/3 A |
| D381,794 | S | * | 8/1997 | Gelli ........................... D2/916 |
| 5,814,254 | A |   | 9/1998 | Bisconti |
| D416,667 | S | * | 11/1999 | Lamstein ..................... D2/916 |
| D431,346 | S | * | 10/2000 | Birkenstock ................ D2/916 |
| 6,237,249 | B1 | * | 5/2001 | Aguerre ....................... 36/11.5 |
| 6,256,906 | B1 | * | 7/2001 | Matis et al. ................. 36/11.5 |
| 6,640,464 | B2 | * | 11/2003 | Hsin et al. ................... 36/11.5 |

FOREIGN PATENT DOCUMENTS

| | | |
|---|---|---|
| EP | 0802039 A2 | 10/1997 |
| EP | 0802040 A2 | 10/1997 |
| EP | 0802041 A2 | 10/1997 |
| EP | 0884005 A1 | 12/1998 |

OTHER PUBLICATIONS

Rhoda Miel, *Snowshoe walks away with best design*, Plastics News, Apr. 22, 2002, v14, n8, p4 (2 pages).
Luisa Zargani, *One Fine Year; Anton Magnani's Quirky Dry-Shod Designs Have Gained the Italian Designer Respect, Recognition and a Deal With Comme Des Garcons*, Footwear News, Aug. 2, 1999, p. 102 (2 pages).
*Finproject Brews an Extralight* (Evasol Plastics and Finproject signed a joint venture agreement to introduce a range of new block and net-fit soles for shoes), FN World, Aug. 4, 1997, v. 53, n.31, p. 8 (1 page).

(Continued)

*Primary Examiner*—Jila M. Mohandesi
(74) *Attorney, Agent, or Firm*—Townsend and Townsend and Crew LLP

(57) ABSTRACT

Among other things, the present invention provides various footwear pieces, and methods for manufacturing such pieces. In various cases, the footwear pieces are molded from a lofting material. Further, in various cases, the footwear pieces include one or more ventilators formed in the footwear piece that are surrounded by liquid conductors capable of channeling liquid spilled on the surface of the footwear pieces away from a foot within the footwear pieces.

2 Claims, 12 Drawing Sheets

OTHER PUBLICATIONS

Cindy Macdonald, *The entrepreneurs: they're bilingual, multicultural and talented. Distance and language present no barries to Quebec plastics processors and moldmakers as the province's plastics industry continues to increase its level of exports and welcome new companies*, Canadian Plastics, O'99, v. 57(10), p. 35-50 (9 pages).

*The Elastomers Times: Engage Adds Comfort to Sporting Components, Chemical Business NewsBase: The Elastomers Times*, Friday, Dec. 1, 2000, (1 page).

*Comfortable Walking, Italian Technology*, Oct., 1999, No. 3, p. 168, (abstract, 1 page).

*Injected Eva, Macplas International*, Aug., 1999, No. 10, p. 90, (abstract, 1 page).

*Walking on Modified Eva, Italian Technology*, May 1999, No. 2, p. 121, (abstract, 1 page).

*Trade Name Record, Official Gazette of the US Patent and Trademarks Office*, Mar. 24, 1998, 1208, No. 4, p. 73, (abstract, 1 page).

*Engage® polyolefin elastomers, the critical ingredient for success*, DuPont Dow elastomers, Copyright @ 2000 DuPont Dow Elastomers, www.dupont-dow.com/engage (12 pages).

waldenstore.com, *Footwear, Watdies*, Aug. 4, 2003, http://www.waldenstore.com/waldies.html, (1 page).

*Birkenstock®, Spring & Summer 2003 Catalog*,Birkenstock Orthopudie GMbh, Germany.

\* cited by examiner

BREATHABLE FOOTWEAR PIECES

The present application claims priority to U.S. Provisional Pat. Appl. No. 60/473,360, entitled "FOOTWEAR PIECES AND METHODS FOR MANUFACTURING SUCH," filed May 23, 2003 and assigned to an entity common herewith; and U.S. Provisional Pat. Appl. No. 60/473,371, entitled "METHODS AND COMPOSITES FOR MANUFACTURING FOOTWEAR PIECES," also filed May 23, 2003 and assigned to an entity common herewith. Further, the present application is related to U.S. Pat. Appl. No. 10/602,416, entitled "FOOTWEAR PIECES AND METHODS FOR MANUFACTURING SUCH", filed on a date even herewith and assigned to an entity common herewith. The entirety of each of the aforementioned patent applications are incorporated herein by reference for all purposes.

BACKGROUND OF THE INVENTION

The present invention is related to footwear, and in particular to footwear including ventilation.

Current trends are toward wearing comfortable footwear in the work environment. However, many types of comfortable footwear are not compatible with various work environments. For example, many work environments would allow the use of the commonly known flip-flop, however, such flip-flops are typically not compatible with the work environment because they are not secure and are not waterproof. Similarly, sandals are not waterproof, and are thus not compatible with various work environments. As just one example, in a hospital setting it may be possible to wear comfortable shoes, however, it is common for liquids to be spilled. Thus, neither a flip-flop or sandal may not offer sufficient protection from such spilled liquids.

Thus, there exists a need in the art to address these and other limitations.

BRIEF SUMMARY OF THE INVENTION

Among other things, the present invention provides various footwear pieces, and methods for manufacturing such pieces. In various cases, the footwear pieces are molded from a lofted material. Further, in various cases, the footwear pieces include liquid conductors formed around ventilators, or openings in the upper of the footwear piece. Such liquid conductors operate to disperse liquids away from a foot inserted in the footwear piece.

Some embodiments of the present invention provide breathable footwear pieces that include a base section comprising an upper and a sole. The upper includes a substantially horizontal portion and a substantially vertical portion. The substantially horizontal portion is a solid portion, while the substantially vertical portion includes one or more ventilators formed in the substantially vertical portion. In particular instances, liquid conductors are formed around each of the ventilators. In some cases, the liquid conductors are molded as part of the upper, while in other cases, the liquid conductors are attached to the upper after the upper is otherwise formed. In one particular case, the material used to form the base section exhibits a final growth value of approximately 1.51. Such a growth value provides a lightweight, comfortable footwear piece that floats in water, and is slip resistant when used on, for example, wet floors.

Other embodiments of the present invention provide sectional shoe pieces that include a base section and a strap section. The base section includes an upper and a sole formed as a part. The strap section is formed as a second part that is attached to the base section such that the strap pivots relative to the base section. In some instances, the base section is molded of a continuous piece of foam material. Such foam material can be lofted material manufactured using a resin. Where a resin material is used, it can be mixed to exhibit an expansion coefficient, and a contraction coefficient. In particular cases, multiplying the expansion coefficient and the contraction coefficient results in a product of between 1.46 and 1.58, inclusively.

In various instances, the base section and the strap section are formed of the same material. Such material can be the aforementioned foam material formed into different shapes. In other cases, the strap section and the base section are formed of different materials. For example, the base section may be formed of leather and/or rubber, while the strap section is formed of foam. As another example, the base section may be formed of one type of foam, while the strap section is formed of another type of foam.

In some cases, the strap section is attached to the base section by rivets. In particular, one end of the strap section is riveted to one side of the base section, while the other end of the strap is riveted to the other side of the base section. In some cases, both the base section and the strap are punched to form holes through which the rivet is placed. In other cases, holes are formed in the strap section and/or base section as part of the manufacturing process. Such holes can be subsequently used to receive the rivets attaching the strap section to the base section. The rivets can be plastic rivets, or rivets formed of other materials such as, for example, metal and rubber. In many cases, the rivets are formed of a material that is denser than that of either the base section or the strap section.

The rivets can be placed at attachment points located on either side of the base section. Such attachment points can be located near a rear sole perimeter and/or near a upper opening perimeter. In some cases, the distance from the one attachment point to the other attachment point along the rear sole perimeter is approximately the same as the distance between the attachment points measured along the strap section. Thus, the strap section can pivot relative to the base section such that an inner portion of the strap section contacts an outer portion of the rear sole perimeter. A frictional force between the strap section and the base section at the contact between the inner portion of the strap section and the outer portion of the rear sole perimeter maintains the strap section fixed relative to the base section. In such a position, the strap section forms what appears to be a decorative portion of the base section, and does not interfere with inserting and removing a foot from the base section.

Similarly, the distance from one attachment point to the other attachment point along the upper opening perimeter is approximately the same as the distance between the attachment points measured along the strap section. Thus, the strap section can pivot relative to the base section such that an inner portion of the strap section contacts an outer portion of the upper opening perimeter. A frictional force between the strap section and the base section at the contact between the inner portion of the strap section and the outer portion of the upper opening perimeter maintains the strap section fixed relative to the base section. Again, in such a position, the strap section forms what appears to be a decorative portion of the base section, and does not interfere with inserting and removing a foot from the base section. Further, in some cases, the strap can be fixed in contact with either the upper opening perimeter or the rear sole perimeter.

In various cases, a number of ventilators are formed in the upper. Such ventilators can be holes of varying sizes that allow liquid and or air to pass through at prescribed locations in the upper. In some cases, such ventilators are formed in both a substantially horizontal portion of the upper and a substantially vertical portion of the upper. This provides for a significant amount of ventilation for applications where it is not necessary to protect the foot from exposure to liquids entering through the ventilators. Such applications can include, but are not limited to, boating, beach use, fishing, and the like.

Alternatively, some instances include a solid covering over the substantially horizontal portion of the upper, while including ventilators formed in the vertical portions of the uppers. This provides for sufficient ventilation, while at the same time protecting a foot from spilled liquids. Such an approach may be desirable for applications including use by medical personnel, chefs, and the like. Further, in some cases, a liquid conductor is formed around at least a portion of a perimeter of each of the plurality of ventilators. Such a liquid conductor transfers a liquid spilled on the upper around and away from the various ventilators formed in the substantially vertical portion. Such conductors can thus further protect the foot from exposure to spilled liquids.

In particular cases, the toe region of the upper is extended at a location corresponding to the larger toes of the human foot. Thus, the toe region of the upper generally follows the contour of a human foot from larger toes on the inside of the shoe to smaller toes on the outside of the shoe. Such an approach can provide increased comfort and/or functionality. Further, the rear perimeter of the sole can be raised above a support base further increasing the functionality of the shoe. This support base can include a raised pattern where the foot contacts the shoe.

Other embodiments of the present invention provide sectional shoe pieces that include a base section and a strap section. The strap section is attached to the base section using a rivet such that the strap is pivotable relative to the base section. The rivet can be made of metal, plastic, or some other material. In some cases, the base section is formed of a continuous piece of foam, while in other cases, the base section includes an assemblage of multiple constituent parts. The parts can be formed of various materials including, but not limited to, foam, plastic, rubber, leather, and/or the like.

Yet other embodiments of the present invention provide methods for manufacturing a sectional shoe. The methods include molding a base section and a strap section. The methods further include attaching the strap section to the base section such that the strap pivots relative to the base section. In some cases, the strap section is attached to the base section by riveting opposite ends of the strap to opposing sides of the base section. In various cases, holes are punched through the base section and the strap section prior to riveting the strap section in place. In other cases, the holes through which the rivet are placed are formed during the molding of the base section and/or strap section.

The base section can include a sole and an upper. The sole includes a rear sole perimeter, and the upper includes an upper opening perimeter. In particular cases, rivet holes are placed approximately equidistant from a midway point of the rear sole perimeter and from a midway point of the upper opening perimeter. Thus, the strap can be folded over the upper and the sole and worn as a decorative feature, or in contrast worn away from either the sole or the upper as a functional strap.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Among other things, the present invention provides various footwear pieces, and methods for manufacturing such pieces. In various cases, the footwear pieces are molded from a lofted, or foam material material. Further, in various cases, the footwear pieces include liquid conductors formed around ventilators, or holes, in the footwear piece. Such liquid conductors operate to disperse liquids away from a foot inserted in the footwear piece.

Figure 1:
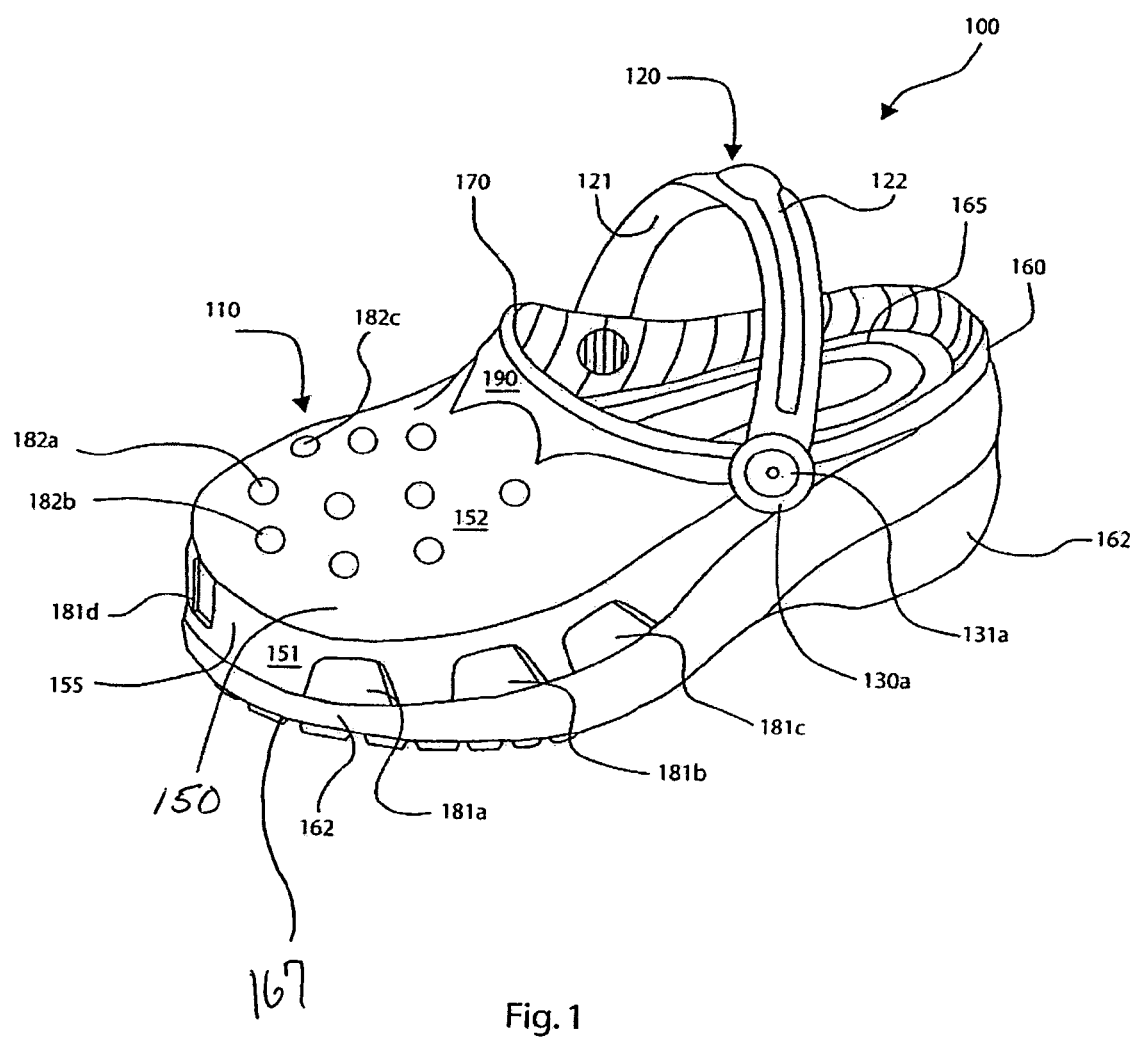
FIGS. 1–6 are views of a footwear piece in accordance with embodiments of the present invention.

Turning to FIG. 1, a footwear piece 100 in accordance with some embodiments of the present invention is illustrated. Footwear piece 100 includes a base section 110 and a strap section 120. Base section 110 includes an upper 150 and a sole 162. In some embodiments, base section 110 is molded as a single piece of foam material. In other embodiments, sole 162 is molded from a foam or other foam like material, while upper 150 is manufactured of a different material that is later assembled with sole 162 to form base section 110.

Upper 150 includes a substantially horizontal portion 152 that can include one or more ventilators 182. Ventilators 182 can be, but are not limited to, openings that are formed in upper 150 as base section 110 is being molded. Alternatively, ventilators 182 can be openings formed in upper 150 after formation and/or assembly of upper 150. As yet another alternative, ventilators 182 can be formed as part of an assembly process associated with upper 150. Thus, for example, ventilators 182 can be openings between assembled parts of upper 150. Based on the disclosure provided herein, one of ordinary skill in the art will appreciate a number of different ventilator types and methods for forming such.

Upper 150 further includes a substantially vertical region 151 that includes one or more ventilators 181. FIG. 1 illustrates a preferred embodiment wherein each of the ventilators 181 extend up a majority of the height of vertical region 151. As with ventilators 182, ventilators 181 can be, but are not limited to, openings that are formed in upper 150 as base section 110 is being molded. Alternatively, ventilators 181 can be openings formed in upper 150 after formation and/or assembly of upper 150. As yet another alternative, ventilators 181 can be formed as part of an assembly process associated with upper 150. Thus, for example, ventilators 181 can be openings between assembled parts of upper 150. Based on the disclosure provided herein, one of ordinary skill in the art will appreciate a number of different ventilator types and methods for forming such.

Upper 150 further includes a toe region 155 that surrounds the toes of a human foot inserted into base section 110. In some embodiments, toe region 155 tapers from the inner area of base section 110 to the outer area of base section 110 such that it generally follows the contour of a human foot where larger toes exist at the inside of the foot, and the foot tapers to smaller toes on the outside. This can be functionally advantageous as the footwear piece 100 conforms to the shape of the human foot. In other embodiments, toe region 155 is a square cross section that does not exhibit tapering, while yet other embodiments provide a rounded square where the toe section has its greatest extension near the a central point of base section 110, and tapers in both directions from the central point. Based on the disclosure provided herein, one of ordinary skill in the art will appreciate a number of shapes for toe region 155.

As depicted, upper 150 includes a substantially horizontal region 152 that rises toward an upper opening perimeter 170. When worn, the upper opening perimeter can contact an area of the human foot in front of, and below the ankle. Upper 150 can be designed such that upper opening perimeter 170 is disposed only a short distance from toe region 155, in which case it will be formed in substantially horizontal region 152. Alternatively, upper 150 can be designed to extend farther up the foot toward the ankle, in which cases it will be in a more vertical region of upper 150. A decorative pattern 190 may or may not be molded or otherwise created near upper opening perimeter 170. As depicted, upper opening perimeter 170 and decorative pattern 190 can extend from the location of rivet 131a to that of rivet 131b (shown in other figures).

Figure 5:
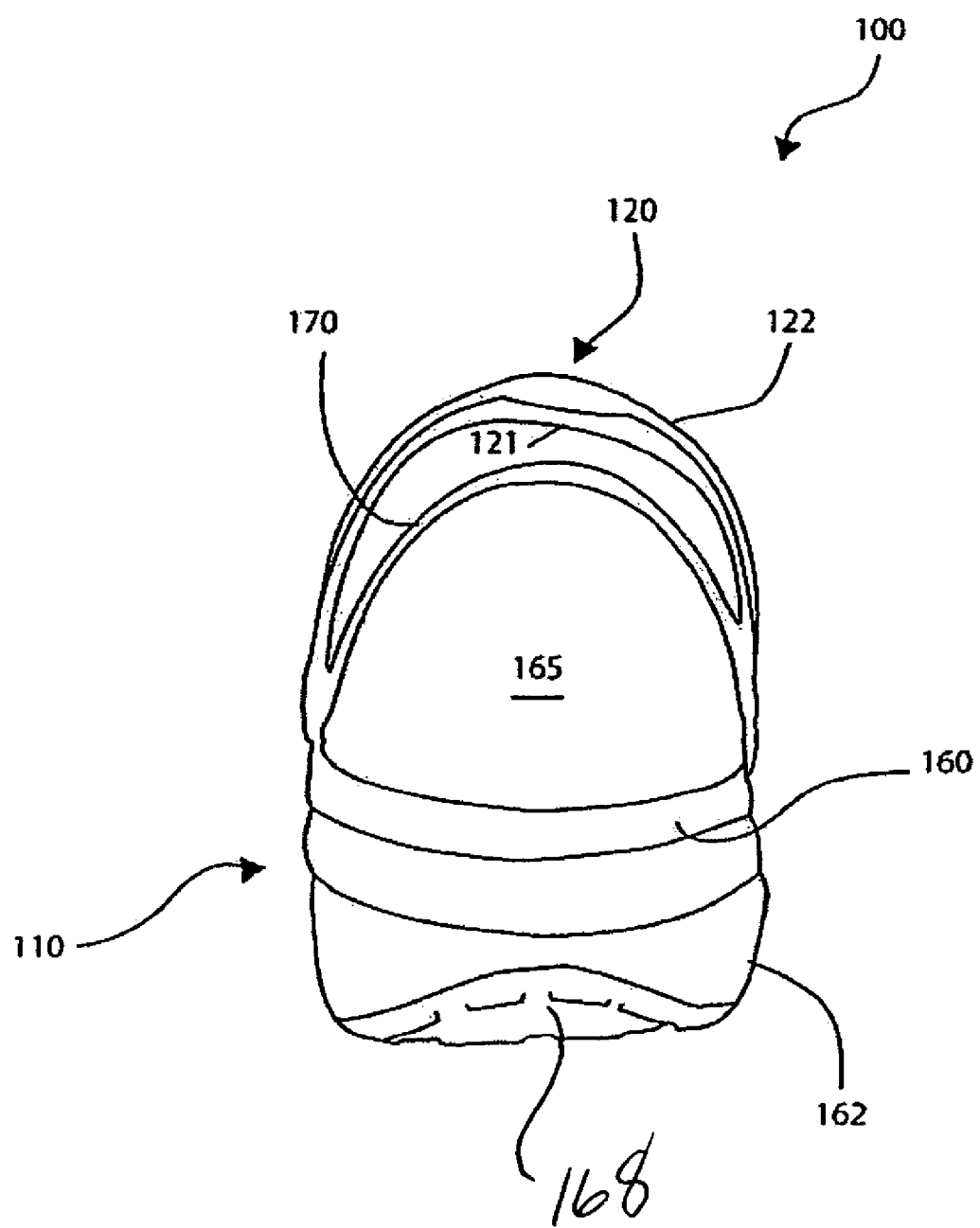

Sole 162 includes a rear sole perimeter 160 that defines the rear portion of sole 160. In some cases, this region is raised above a support base 165 that is the area that is in contact with the bottom part of the human foot. Such a raised rear sole perimeter provides some support to the heel of the human foot and helps maintain footwear piece 100 in position. In other embodiments, rear sole perimeter 160 is not raised. In addition, support base 165 includes a raised pattern 166 throughout the surface where the foot contacts support base 165. As shown in FIG. 1, the bottom surface of sole 162 includes a toe portion 167 that is raised slightly from the generally flat plane of sole 162. As best shown in FIG. 5, the bottom surface of sole 162 also preferably includes a heel portion 168 that is raised slightly from the generally flat plane of sole 162.

Strap section 120 includes an outer region 122, an inner region 121, and rounded ends 130. In some cases, strap section 120 is attached to base section 110 by rivets 131 that are placed through holes in both strap ends 130, and in upper 150 at an attachment point. Strap section 120 can be pivoted in relation to base section 110 such that strap section 120 can contact upper opening perimeter 170 when pivoted in one direction, and rear sole perimeter 160 when pivoted in the other direction. In some embodiments strap section 120 includes dimensions such that when strap section 120 is pivoted forward, inner region 121 contacts an outer surface of upper opening perimeter 170. A frictional force at the contact of inner region 121 and upper opening perimeter 170 maintains strap section 120 in a fixed position relative to base section 110.

Alternatively, strap section 120 can include dimensions such that when strap section 120 is pivoted backward, inner region 121 contacts an outer surface of rear sole perimeter 160. A frictional force at the contact of inner region 121 and rear sole perimeter 160 maintains strap section 120 in a fixed position relative to base section 110. In such positions, strap 120 can be a decorative portion of footwear piece 100.

As yet another alternative, strap section 120 can be placed in an intermediary position between rear sole perimeter 160 upper opening perimeter 170. In this position, the strap serves the utilitarian purpose of lending support to the Achilles portion of the human foot, thus helping to maintain footwear piece 100 in position on the human foot. In some embodiments, a frictional force developed between strap 120 and upper 150 at the location of the rivets is sufficient to maintain strap 120 in place. This helps to assure that strap 120 remains in place even when the Achilles part of the foot is not pressing against strap 120. Without such friction, strap 120 would succumb to gravity and fall to a position where the foot would not be supported. At the same time, it can be desirable to reduce the friction at the contact point sufficient to allow strap 120 to be readily moved.

In particular embodiments, strap 120 is formed of a foam material capable of significant deformation making footwear piece 100 comfortable for a large number of foot types. In other embodiments, strap 120 is form of a less deformable material that provides a stronger security for the foot. Yet other embodiments include an adjustable strap that includes significant deformability, yet is capable of capable of being securely strapped to the foot. Such embodiments are discussed further in relation to FIG. 10 below.

Figure 2:
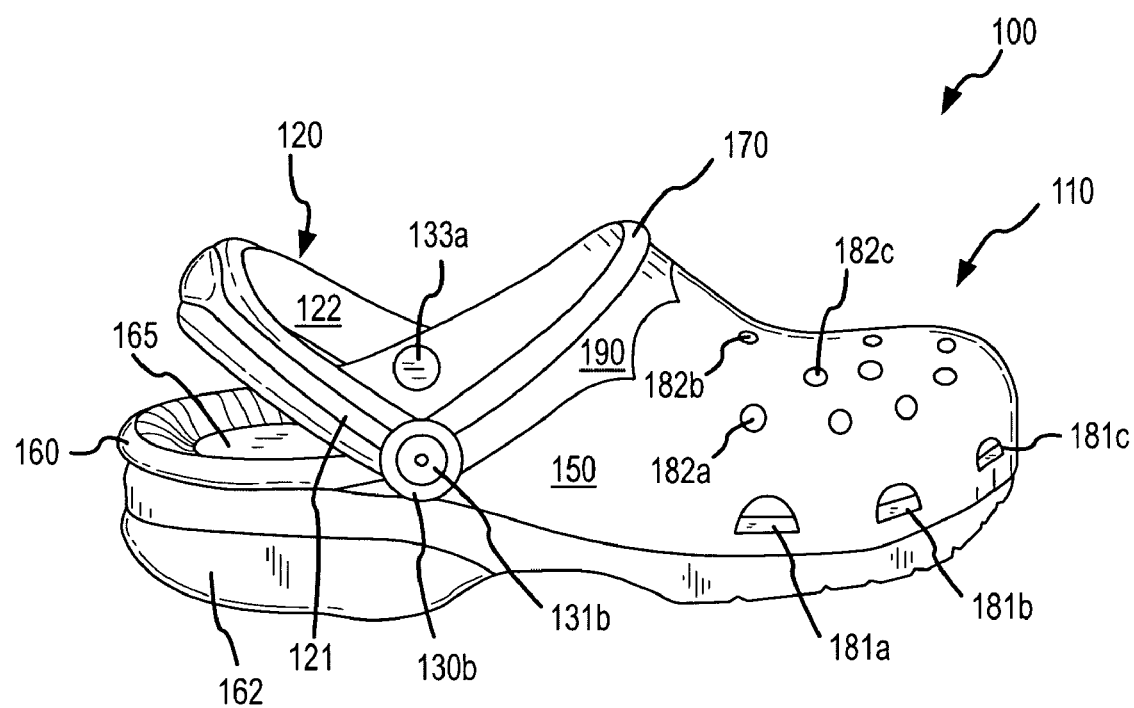
Figure 3:
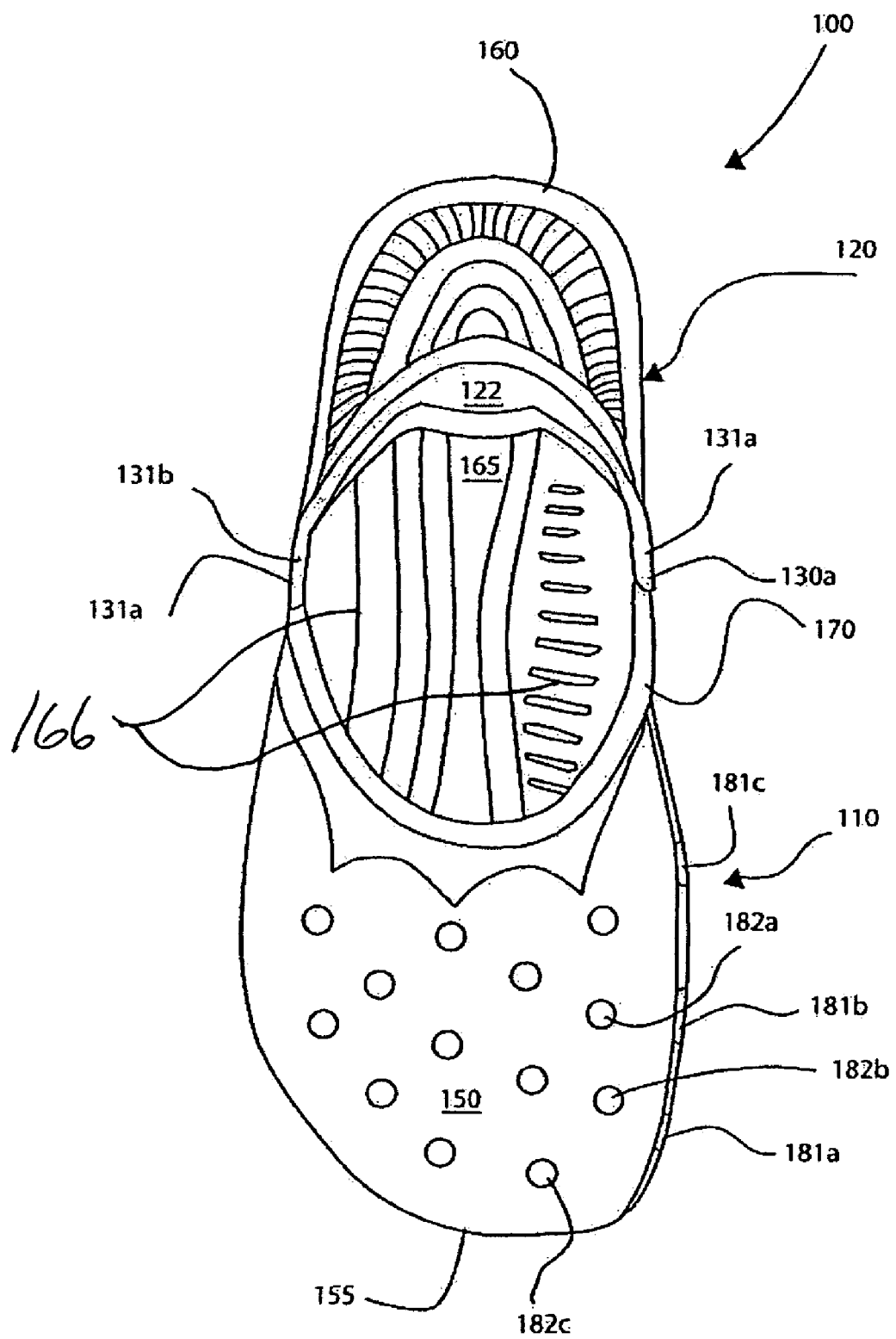
Figure 4:
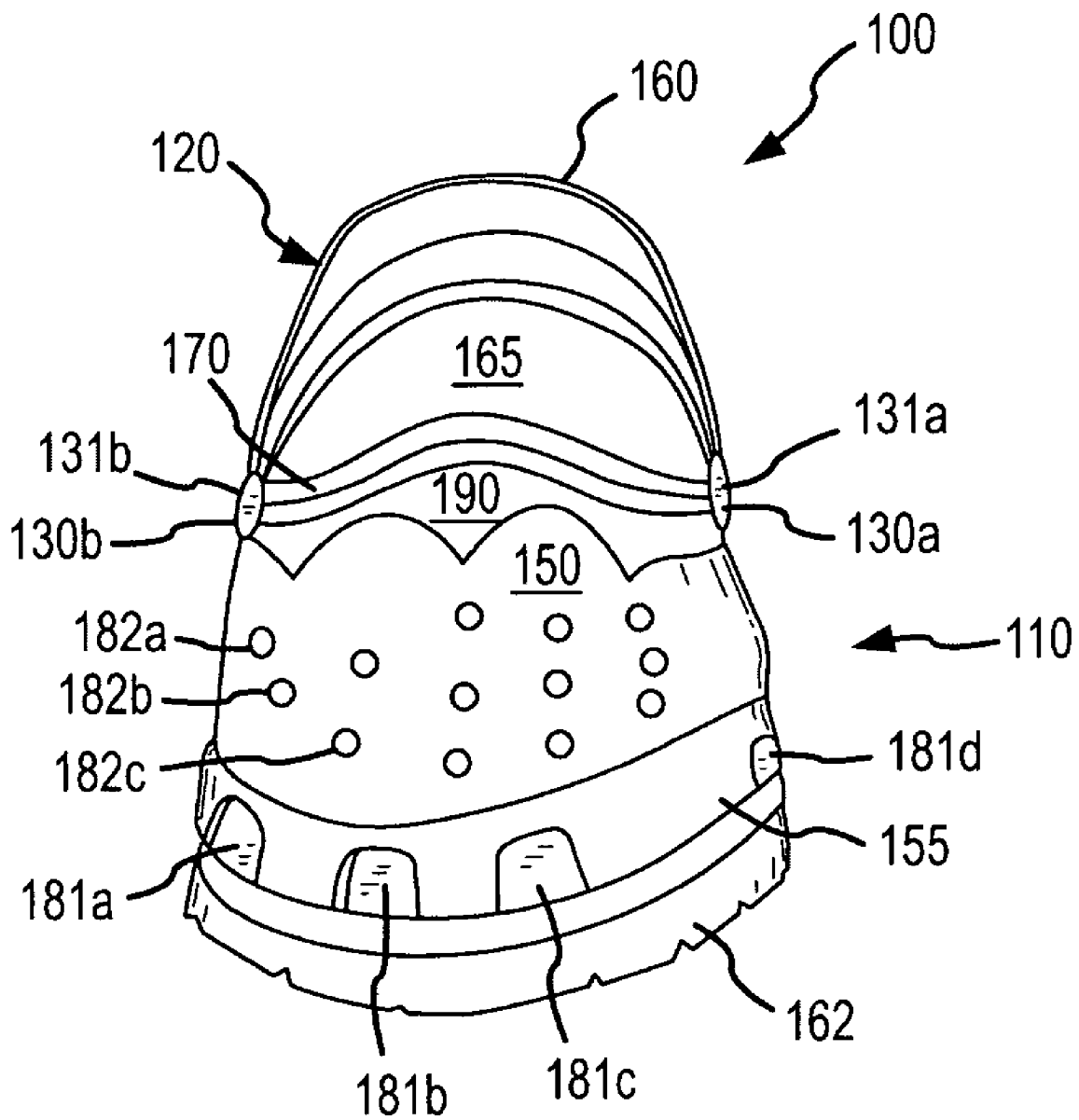
Figure 6:
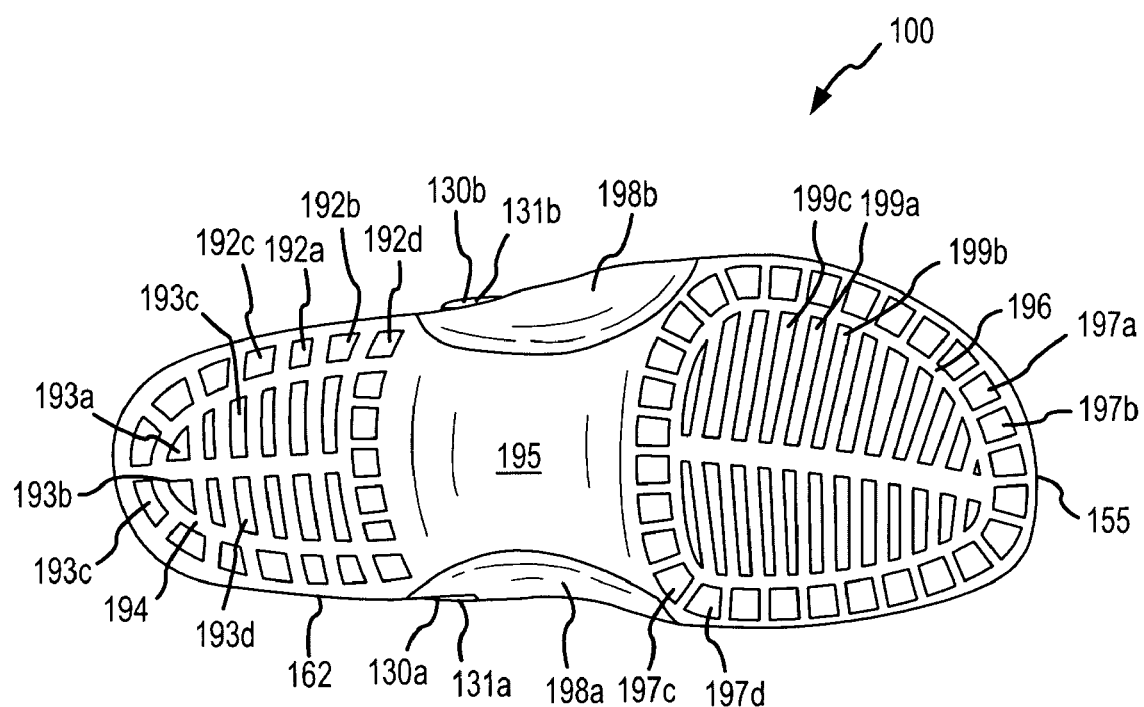

FIG. 2 depicts a side view of footwear piece 100, while FIG. 3 provides a top view of footwear piece 100. FIGS. 4 and 5 provide front and rear views, respectively, of footwear piece 100. Further, FIG. 6 illustrates the bottom of sole 162. As illustrated, sole 162 includes raised side portions 198, front tread pattern 196, and rear tread pattern 194. Front tread pattern 196 includes inner longitudinal tread portions 199, and outer rectangular tread portions 197. Similarly, rear tread pattern 194 includes inner longitudinal tread portions 193, and outer rectangular tread portions 192. Based on this, one of ordinary skill in the art will appreciate a number of other trade patterns and/or formations that can be used in relation to footwear piece 100.

Figure 7:
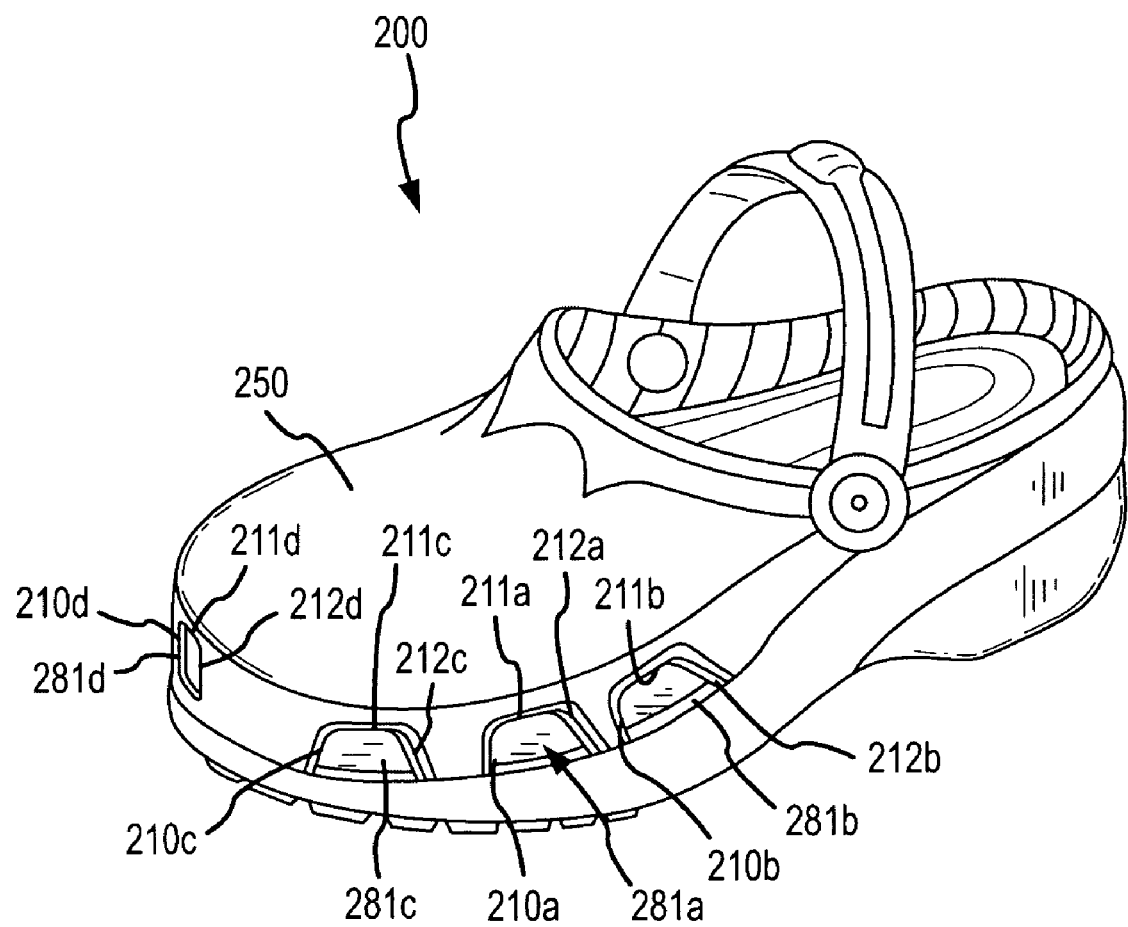
FIGS. 7–8 are views of another footwear piece in accordance with other embodiments of the present invention.
Figure 8:
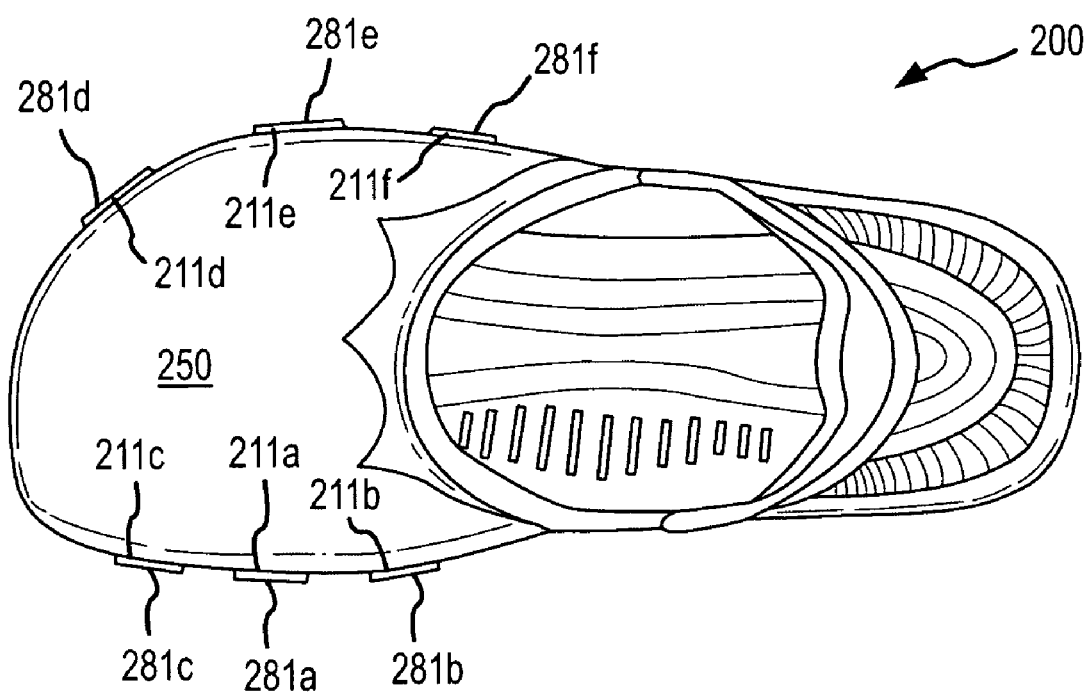

Turning to FIG. 7, another footwear piece 200 in accordance with other embodiments of the present invention is illustrated. Footwear piece 200 includes a number of features similar to that of the previously described footwear piece 100. In contrast, however, substantially horizontal portion 250 of the upper is of solid construction. As such, liquid materials that are spilled or otherwise contact substantially horizontal portion 250 do not permeate footwear piece 200. This can be advantageous in medical or other commercial applications where the foot needs at least some protection from spilled materials. Further, a number of ventilators 281 are formed in the substantially vertical portion of the upper. Liquid conductive portions 210, 211, 212 are formed around each of ventilators 281. Liquid conductive portions 210, 211, 212 can be any formation or structure that can divert a liquid falling from above footwear piece 200 from entering through ventilators 281. In one embodiment, liquid conductive portions 210, 211, 212 are molded as part of the upper. FIG. 8 is a top view of footwear piece depicting the various liquid conductive portions.

Figure 9:
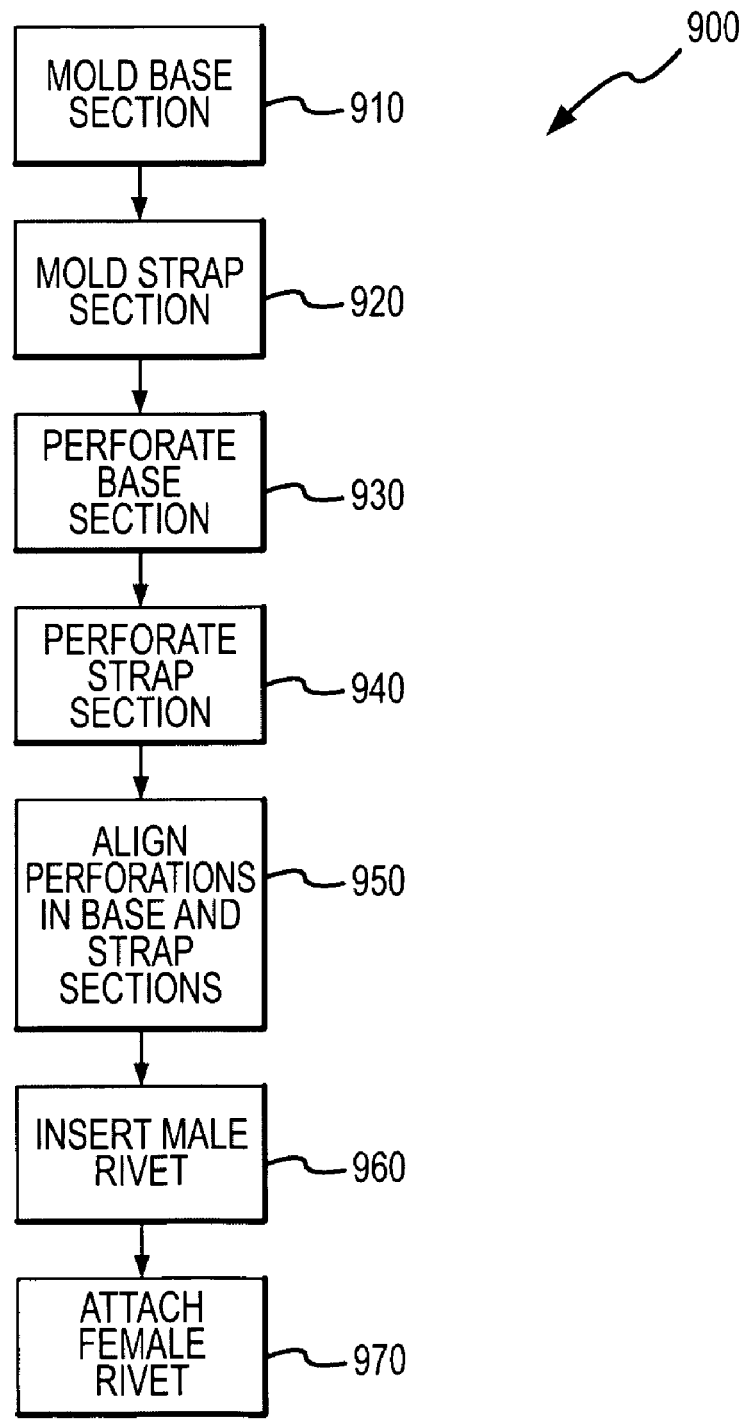
FIG. 9 is a flow diagram illustrating methods for manufacturing in accordance with embodiments of the present invention.

FIG. 9 is a flow diagram 900 illustrating a method in accordance with the present invention for manufacturing footwear pieces. Following flow diagram 900, a base section and strap section are molded (blocks 910, 920). The base section and strap section are perforated at the location where the two pieces are to be connected (blocks 930, 940). The perforations in the strap and base section are aligned (block 950), a male portion of a rivet is inserted through the aligned perforations (block 960), and a female portion of the rivet is mated to the male portion, thus securing the strap to the base section.

Figure 10A:
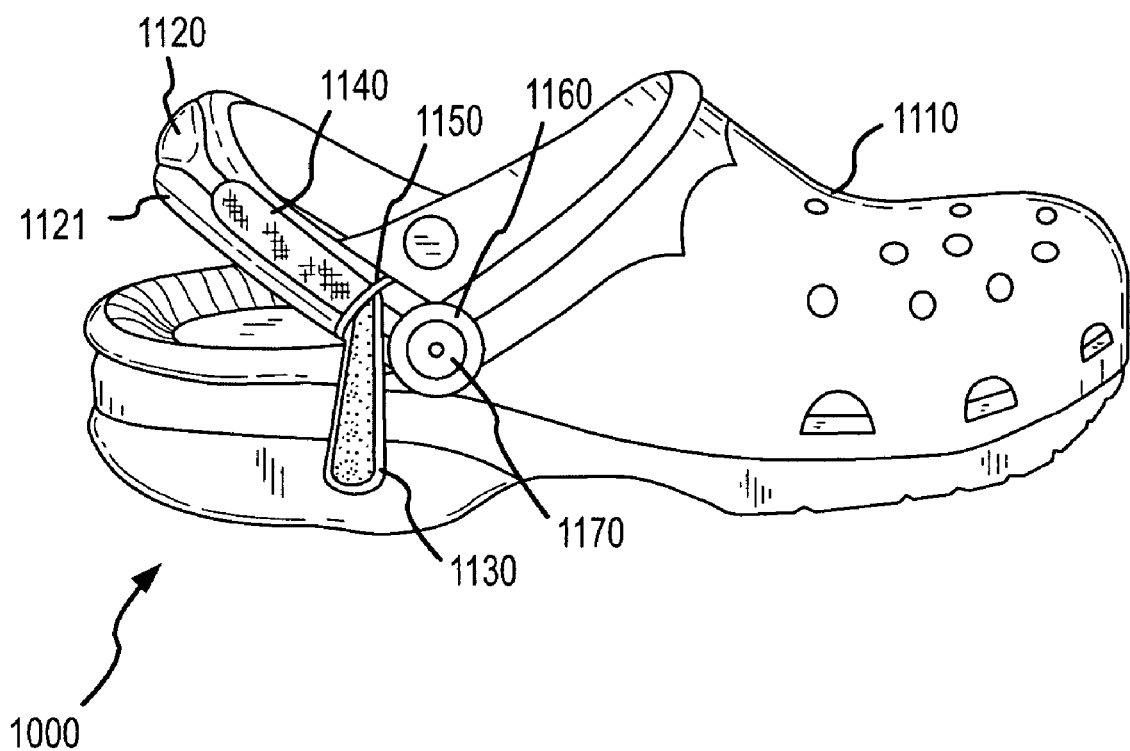
FIG. 10 illustrates another footwear piece in accordance with other embodiments of the present invention.

Turning to FIG. 10, another footwear piece 1000 in accordance with other embodiments of the present invention is illustrated. Footwear piece 1000 is similar to previously described footwear piece 100, except that strap 1120 has been modified to allow for adjustment. As illustrated, strap 1120 includes a main portion 1121 and a connection portion 1160. Connection portion 1160 is attached to a base section 1110 of footwear piece 1000 by a rivet 1170, or some other pivotable connection as is known in the art. Main portion 1121 is attached to the opposite side via a rivet (not shown), and includes a male Velcro portion 1140 attached thereon, and a female Velcro portion 1130 extending like a tongue therefrom.

Figure 10B:
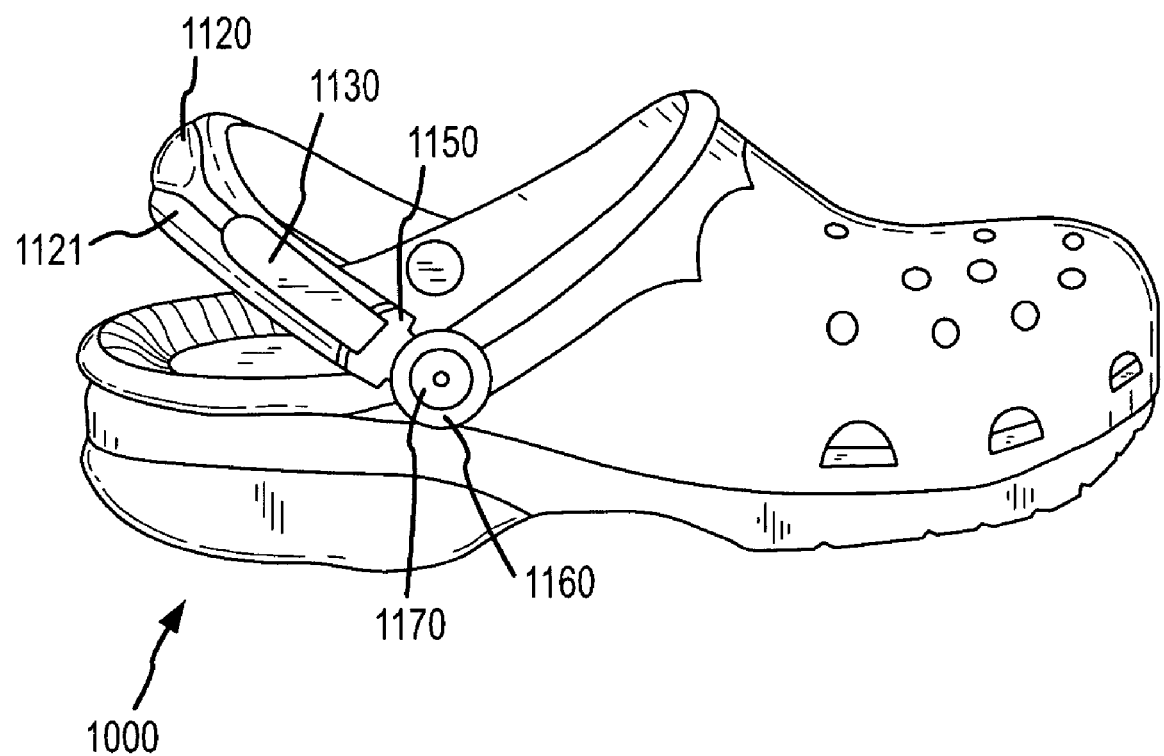

Female Velcro portion 1130 is fed through a buckle 1150 that is attached to connection portion 1160 and pulled until the desired tightness is achieved. Female Velcro portion 1130 is then laid over male Velcro portion 1140 as depicted in FIG. 10b. One of ordinary skill in the art will appreciate that other connection materials can be used in place of Velcro and that the male 1140 and female 1130 Velcro portions can be interchanged. Further, based on the disclosure provided herein, one of ordinary skill in the art will appreciate that an adjustment can be used on either or both sides of strap 1120, or can be placed in the center of strap 1120.

Figure 11:
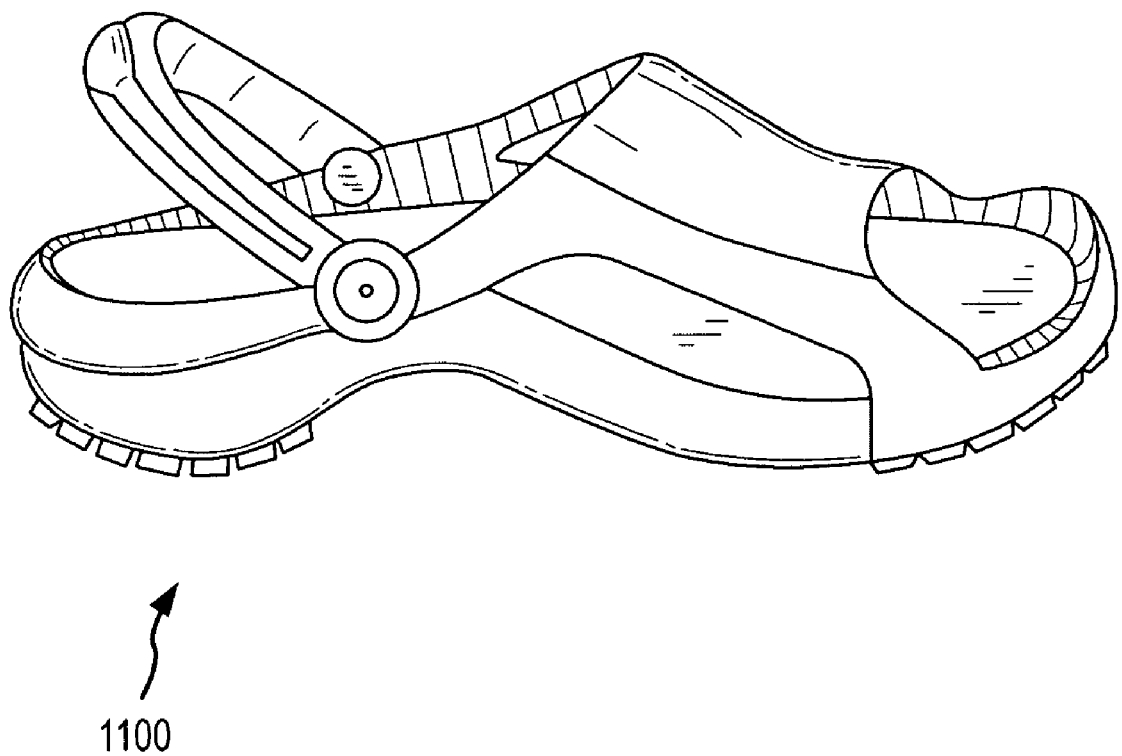
FIG. 11 illustrates yet another footwear piece in accordance with various embodiments of the present invention.

FIG. 11 illustrates yet another footwear piece 1100 in accordance with some embodiments of the present invention. Footwear piece 1100 is an open toe model with a pivotable strap. Based on the disclosure provided herein, one of ordinary skill in the art will appreciate that adjustable strap 1120 depicted in FIG. 10 can also be used in relation to footwear piece 1100.

As previously suggested, the footwear pieces disclosed herein can be made of a lofted foam material. Manufacturing footwear pieces using such a lofted foam material can include providing a resin that includes a pre-mixture of resin, pigment, and a growth additive. The resin, originally in pellet form, is heated to a liquid state. This liquid resin is screwed into a mold that has been heated prior to receiving the resin. The volume of resin injected into the mold is controlled by the pitch of the screw that drives the liquid resin into the mold. The liquid resin is allowed to set, at which time the mold is opened and the formed footwear piece is removed from the mold. The formed footwear piece is then placed on a cooling last, where it is allowed to air dry.

During this process, a relatively small footwear piece confirming to the size of the mold is created, but when the mold opens, the footwear piece springs out as it expands in size. Then, as the footwear piece is air cooled, it contracts to a final size. Thus, the process involves both an expansion characteristic and a contraction characteristic. Multiplying the size of the shoe in the mold by the expansion characteristic yields the size of the footwear piece after the mold is opened. Multiplying the expansion characteristic by the contraction characteristic provides a final growth value representative of the final size of the shoe relative to the mold.

In such a manufacturing process, a number of elements can be controlled to achieve the desired end result. These elements include, the volume of material introduced into the mold, the size of the mold, the composition of the material being used, and the size of the cooling last. Previous manufacturers of molded footwear products have used, for example, four sizes of molds to create six different sizes of footwear pieces. Thus, for example, to create two different sized shoes from the same mold, one volume of a material is screwed into a mold to create one shoe size, and another volume of the same material is screwed into the same mold to create a different shoe size. Once removed from the mold, the shoes are cooled on cooling lasts of different sizes. Thus, the process uses a modified volume and cooling last size to control the end product, while keeping the mold size and the composition fixed. While this creates shoes of different sizes, it has been found that control of the final sizes is somewhat limited and/or unpredictable.

In part to address this, embodiments of the present invention use a fixed volume and composition of material, and cooling last size, while varying mold sizes to control the size of the end product. It has been found that such an approach results in a heightened degree of control, when compared to the previously described approach. This approach is particularly valuable for shoes manufactured of the same color resin. Where different colors are involved, the composition of the resin may be varied across the colors to achieve size control between colors. This composition adjustment is more fully described below.

In one particular embodiment, the resin is Ethylene Vinyl Acetate copolymer (EVA) based material. In this particular case, additives are included with the EVA base to create an expansible and cross-linking material. More particularly, an expanding powder is added which decomposes at a specific temperature to produce gases which cause the material to rise as it sets within a mold. Accordingly, when the mold is opened, an instantaneous expansion of the molded part results. During this expansion, the dimensions of the part increase rapidly, while the proportions and shape remain reasonably constant providing a consistent shape of the end part relative to the original mold. Additional disclosure of such cross-linking and expansion is provided in European Patent 0 802 039 A2, filed on Mar. 25, 1997, and assigned to FINPROJECT™ of Italy.

Some embodiments of the present invention utilize an EVA as previously described that is known commercially as LEVIREX™, and is marketed by FINPROJECT™ of Italy. It has been found desirable to create a mixture of LEVIREX™ that exhibits a final growth value of between 1.47 and 1.58. In one particularly desirable embodiment, a final growth value of approximately 1.51 is used. This includes an expansion characteristic of approximately 2.5, and a contraction characteristic of approximately 0.6. This provides a relatively soft footwear piece that has very good anti-slip capabilities, and at the same time, size reproducibility and durability.

In some cases, the resin mixture (LEVIREX™, growth additive such as ENGAGE™ by DUPONT™, and pigment) is modified depending upon the desired color of the footwear piece. This is at least in part due to the density of the pigment associated with certain colors. Were the resin mixture not adjusted, a green shoe would be produced appreciably smaller than a khaki shoe where all other factors remain constant. This can be unacceptable where, for example, the footwear pieces are to be sold over the Internet and the consumer is not capable of trying the footwear piece on before purchasing. To alleviate this, the final growth value for a green resin is adjusted to approximately 1.515, where the final growth value for the khaki resin is adjusted to approximately 1.505. Thus, by modifying the mixture, shoes of accurate sizes across multiple colors can be produced.

While footwear pieces can be molded as previously described, based on the disclosure provided herein, one of ordinary skill in the art will appreciate that various embodiments of the present invention can be utilized in relation to other molding processes, and or assembly methods. For example, a hard plastic footwear piece could be injection molded using techniques known in the art, or a footwear piece could be at least partially made of leather or other natural materials. As another example, the footwear piece could be Freon cooled, rather than air cooled. This could be used to speed the manufacturing process.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A footwear piece comprising:
    a base section including an upper and a sole formed as a single part manufactured from a moldable foam material; and
    a strap section formed of a moldable material that is attached at opposite ends thereof to the upper of the base section with plastic connectors such that the moldable foam material of the strap section is in direct contact with the moldable material of the base section and pivots relative to the base section at the connectors;
    wherein the upper includes an open rear region defined by an upper opening perimeter, and wherein frictional forces developed by the contact between the strap section and the base section at the plastic connectors are sufficient to maintain the strap section in place in an intermediary position after pivoting, whereby the strap section lends support to the Achilles portion of the human foot inserted in the open rear region; and
    wherein the upper includes a substantially horizontal portion and a substantially vertical portion forming a toe region that generally follows the contour of a human foot, wherein the toe region tapers from an inner area of the base section where the larger toes exist to an outer area of the base section where the smaller toes exist; and
    wherein the sole includes a bottom surface having front and rear tread patterns longitudinally connected by a flat section.

2. A footwear piece comprising:
    a base section including an upper and a sole formed as a single part manufactured from a moldable foam material; and
    a strap section formed of a molded foam material attached at opposite ends thereof to the base section such that the strap section is in direct contact with the base section and pivots relative to the base section; and
    wherein the upper includes an open rear region defined by an upper opening perimeter; and wherein the sole includes a rear perimeter; and wherein the strap section pivots between a first contact point on the upper opening perimeter and a second contact point on the rear perimeter, and wherein frictional forces developed by the contact between the strap section and the base section at the points of attachment are sufficient to maintain the strap section in place in an intermediary position after pivoting whereby the strap section lends support to the Achilles portion of a human foot inserted in the open rear region; and
    wherein the upper includes a substantially horizontal portion and a substantially vertical portion forming a toe region that generally follows the contour of a human foot, wherein the toe region tapers from the inner area of the base section where the larger toes exist to the outer area of the base section where the smaller toes exist; and
    wherein a decorative pattern of raised bumps is molded or otherwise created in the upper near to and extending the length of the upper opening perimeter; and
    wherein a plurality of ventilators are formed in both the substantially vertical portion and the substantially horizontal portion, and wherein the ventilators extend up a majority of the height of the vertical portion;
    wherein the vertical portion of the upper includes an upper strip, wherein the ventilators are formed in the upper strip, and wherein the upper strip extends from the toe region to the points of attachment for the strap section, and wherein the sole includes a lower strip that parallels the upper strip and is separated by a line that extends from the toe region to a heel of the footwear piece, and wherein the lower strip vertically rises in a direction toward the heel; and
    wherein the sole includes a bottom surface having front and rear tread patterns longitudinally connected by a flat section without tread patterns bounded by raised side portions; and
    wherein the sole further includes a top surface having a support base including a raised pattern where a foot contacts the support base.

* * * * *